United States Patent

[11] 3,594,767

| [72] | Inventor | Edwin A. Link<br>Waukesha, Wis. |
|---|---|---|
| [21] | Appl. No. | 756,066 |
| [22] | Filed | Aug. 28, 1968 |
| [45] | Patented | July 20, 1971 |
| [73] | Assignee | RTE Corporation<br>Waukesha, Wis. |

[54] ELECTRIC LINE FAULT INDICATOR
10 Claims, 9 Drawing Figs.

[52] U.S. Cl. .................................................. 340/253,
340/373, 340/380
[51] Int. Cl. ....................................................G08b 21/00
[50] Field of Search........................................... 340/253,
380, 373

[56] References Cited
UNITED STATES PATENTS

| 2,225,932 | 12/1940 | Shaw.............................. | 340/380 UX |
| 2,709,800 | 5/1955 | Temple et al..................... | 340/253 |
| 3,177,480 | 4/1965 | Sankey........................... | 340/253 |
| 3,272,174 | 9/1966 | Pribonic........................... | 340/380 X |
| 3,375,510 | 3/1968 | Pitches............................ | 340/253 |

*Primary Examiner*—John W. Caldwell
*Assistant Examiner*—Daniel Myer
*Attorneys*—Ronald E. Barry and James E. Nilles

ABSTRACT: Disclosed herein is a high voltage underground cable fault indicator having a rotor mounted for movement within a sealed housing with a voltage sensitive element to move the rotor in one direction and a current sensitive element to move the rotor in the other direction. Light conductive members may be connected to the housing to provide a visual indication of the position of the rotor in the housing.

PATENTED JUL 20 1971

Inventor
Edwin A. Link

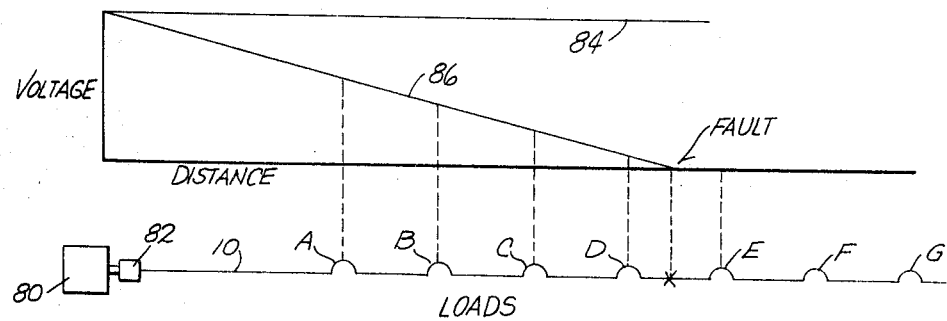
Fig. 5
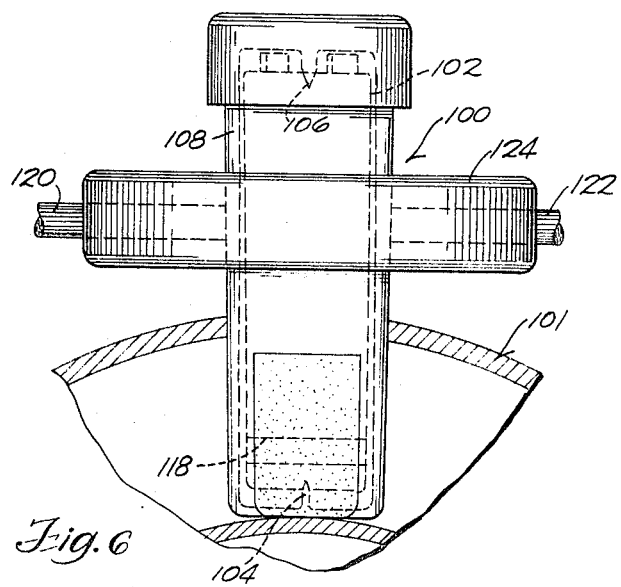
Fig. 6
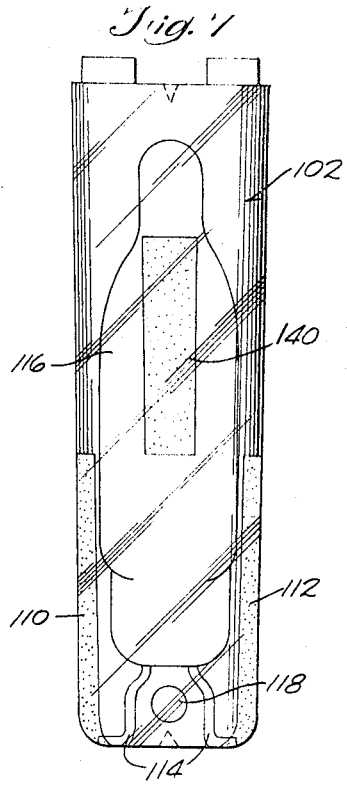
Fig. 7
Fig. 8
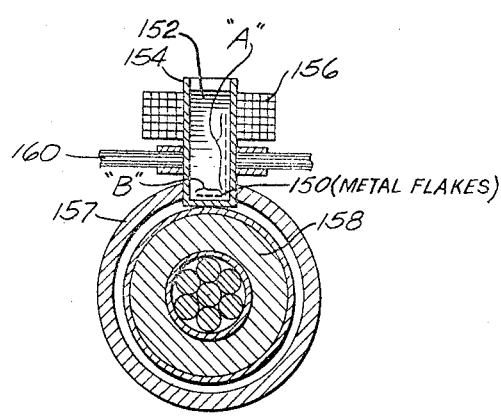
Fig. 9
Inventor
Edwin A. Link

ELECTRIC LINE FAULT INDICATOR

BACKGROUND OF THE INVENTION

When a fault occurs in a section of an electrical conductor or cable for an underground electrical distribution system, line current is interrupted on the entire system until the section of the line or conductor which is faulted is located and isolated. Since the electrical conductor or cables are underground and therefore inaccessible, they present a particularly difficult problem in locating the fault. During the time that it takes to restore line current to the cable, electrical service is not available to the customers along the entire faulted cable. This time interval is dependent principally on the time that it takes to locate the fault. Once the fault is located, the faulted section of the cable can be isolated and line current restored to the remainder of the cable.

SUMMARY OF THE INVENTION

In the present invention a fault detecting or locating system is disclosed for a high voltage underground distribution system which includes a number of visually observable fault indicators mounted at intervals along the cable to provide a visual indication of the electrical condition of the section of the conductor or cable where the indicator is located. More specifically, each of the fault indicators includes a rotor biased in one direction or the other by the forces of the electrostatic and magnetic fields present on an energized conductor. The rotor is arranged to move in one direction to a first position whenever the force of an electrostatic field present on a cable is greater than the force of a magnetic field on the cable and in the other direction to a second position when the force of the magnetic field present on a cable is greater than the force of the electrostatic field. Normally, the rotor will be located in the first position due to the force of the electrostatic field produced by the voltage on an energized cable.

When a fault occurs on the cable, the rotors in the section of the cable where a fault current is present will move to the second position since the force of the magnetic field will exceed the force of the electrostatic field. When current interruption occurs as a result of the fault, the rotors will remain in the position they were in at the time of current interruption. By observing the position of the rotors after current interruption, the operator can tell whether the section of the cable where the fault indicator was attached was under the influence of the force of an electrostatic field or the force of a magnetic field at the time of current interruption. The fault will be in the section of the cable between the last rotor in the second position and the next rotor still in the first position. After the fault has been located and normal line current is restored to the cable, the rotors in the section where the fault current was present will move back to the first position due to the return of the force of the electrostatic field on the cable.

This fault indicator can also be used to determine at any time whether a high voltage underground cable or auxiliary apparatus is energized. This is accomplished by providing a light source on the fault indicator which is responsive to the voltage on the energized cable or apparatus. If the light is "on," the conductor is energized, and if "off," the conductor is deenergized. The fault indicator as disclosed herein not only provides a means for quickly locating a fault in a cable but is low in cost, self-contained, has only one moving part therefore requiring no maintenance, an indefinite life and is self restoring.

Other objects and advantages of the present invention will become apparent when read in connection with the accompanying drawings which:

FIG. 5 is a schematic view of an underground system with a representative voltage-distance diagram showing the normal voltage and voltage drop due to a fault on the cable.

FIG. 6 is a view in section of a modified fault indicator.

FIG. 7 is a view of the rotor for the modified fault indicator.

FIG. 8 is an end view of the rotor shown in FIG. 7.

FIG. 9 is a schematic arrangement of a fault indicator using metal plates as the indicator.

DETAILED DESCRIPTION OF THE INVENTION

Figure 1:
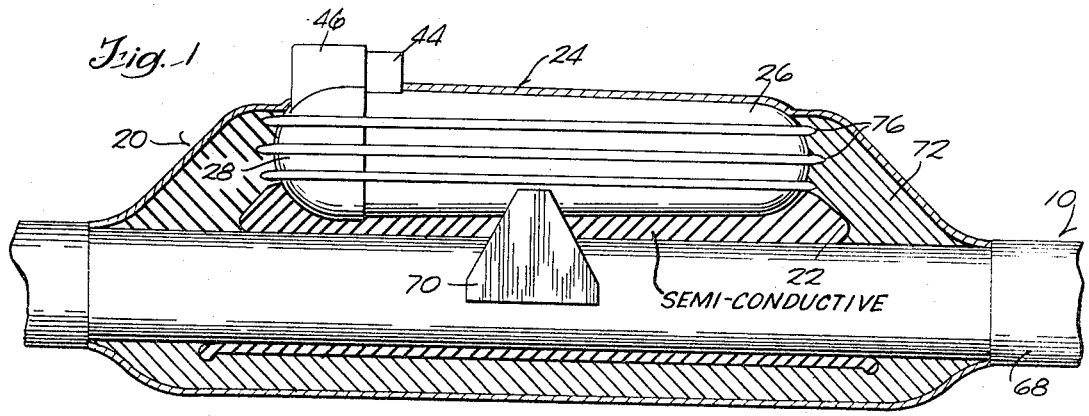
FIG. 1 is a side view in section showing the fault indicator mounted on an electrical conductor.
Figure 2:
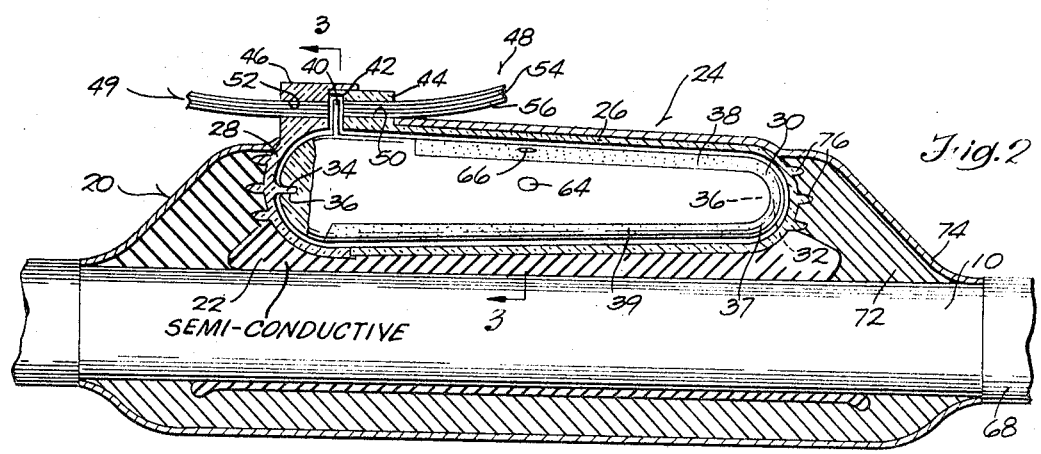
FIG. 2 is a side view of the fault indicator with a part of the housing broken away.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The fault indicators 20 of the present invention are normally spaced at intervals along a high voltage cable 10 to provide a means of determining the electrical condition of the sections of the cable between the fault indicators 20 just prior to the time that the current is interrupted. The electrical condition of each section of the cable is indicated by means of a rotor 30 arranged in each of the fault indicators 20 to move in one direction to a first position in response to a voltage on the cable 10 and in the other direction to a second position in response to a momentary surge or fault current on the cable 10. The rotor 30 is dynamically balanced to remain stationary any time line current is interrupted and the electrostatic and magnetic forces drop to zero. By visually observing the position of the rotor 30 in the fault indicator 20 after current interruption, the operator can tell the section of the cable where a fault current was present if current interruption occurred because of a fault. The location of a fault in a section of the conductor 10 is determined by inspecting the fault indicators starting from the power source 80 (FIG. 5). The first indicators 20 along the cable will be tripped due to the fault current. The operator continues to check each succeeding indicator until he comes to the fault indicator that has not been tripped, i.e., still in the original position. The operator will then know that the fault should have occurred in the section of the cable between the last two fault indicators checked. Once the faulted section has been located, the operator can switch the system to isolate the faulted section and reroute power. This minimized outage time for customers along the cable.

More particularly, the fault indicator 20 includes a housing 24 formed from a capsule 26 closed and sealed by an end cap 28. The rotor 30 is mounted for rotational movement within the housing 24 on a pivot pin 32 formed within the capsule 26 and a pivot pin 34 formed within the end cap 28. The pivot pins 32 and 34 are axially aligned and are inserted into recesses 36 provided at each end of the cylindrical rotor 30. The rotor 30, capsule 26 and cap 28 are all molded from a clear plastic material such as polymethylmethacrylate which is a dielectric, noncorrosive material. A dielectric fluid such as oil may be used to fill the space between the rotor 30 and the housing 24.

Figure 3:
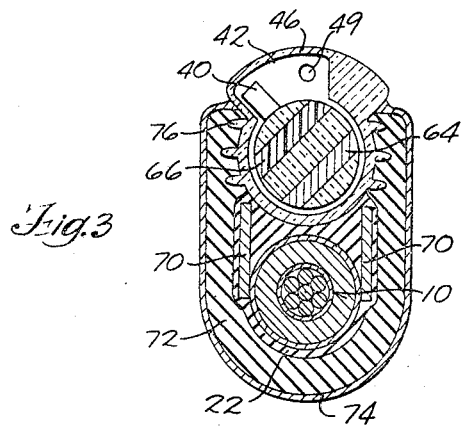
FIG. 3 is an end view taken on line 3-3 of FIG. 1 showing the rotor in the first position.
Figure 4:
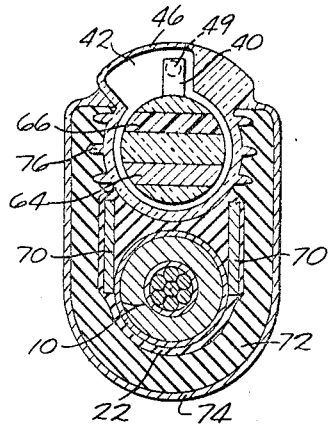
FIG. 4 is an end view similar to FIG. 2 showing the rotor in the second position.

If the indicator 20 is located in a position where it can be observed, the position of the rotor 30 within the housing 24 can be easily noted. Various means can be used to indicate the position of the rotor and in the drawings a mask 40 is provided on the outer surface of the rotor 30 and extends outwardly into a space 42 provided between a boss 44 on capsule 26 and a boss 46 on end cap 28. Rotation of the rotor 30 within the housing will move the mask 40 to a first position at one side of the space 42 (FIG. 3) and rotation in the other direction will move the mask to a second position at the other side of the space 42 (FIG. 4). In this description the first position indicates that the rotor moved in response to an electrostatic force and the second position indicates that it moved in response to a magnetic force. These positions can be reversed if desired.

If the fault indicator 20 is located in a position where it cannot be observed, light conductive members 48 and 49 are inserted into recesses 50 and 52 provided in each of the bosses 44 and 46, respectively, with the ends of the wires positioned in axial alignment on each side of the space 42. The light conductive members 48 and 49 are formed from a bundle of fiberglass filaments or pipes 54 covered with a plastic coating 56. When a light is shined on the outer end of the members 48, the light can be seen at the outer end of the member 49 if the mask is in the first position (FIG. 3). When the mask 40 is moved to the second position (FIG. 4), it will be located in the gap between the inner ends of the members 48 and 49, and will block the light path through the conductive members. Therefore, the position of the rotor can be determined by shining a light into the outer end of either of the members 48 or 49, and if the light can be seen at the outer end of the other member, the rotor 30 is in the first position and if it cannot be seen, the rotor 30 is in the second position.

The force of the electrostatic field caused by the voltage on an energized cable provides a bias which is used to rotate the rotor 30 to the first position and the force of the magnetic field caused by the surge current in a faulted cable provides a bias which is used to rotate the rotor to the second position. More specifically the force of the electrostatic field due to the voltage on the cable is sensed by means of electrically conductive patches 38 and 39 painted on the outer surface of the rotor 30 and connected at one end of the rotor by an electrically conductive strip 37. The electrically conductive patches 38 and 39 form a capacitive circuit that assumes a known position with respect to the radial forces of the electrostatic field on an energized cable. Although two conductive patches 38 and 39 have been described to move the rotor 30, a single patch could also be used.

The rotor may be rotated by means of any voltage sensitive element such as an iron vane that would provide a voltmeter-type movement of the rotor 30. In considering such voltmeter movement, the magnetic fields produced should act independent of the magnetic field formed by the current flow through the cable.

The force of the magnetic field due to current flow in the cable is sensed by means of a magnetic armature 64 embedded in the rotor 30. The armature 64 will assume a known position with respect to the magnetic lines of force around the cable when the force of the magnetic field due to line current on the cable (FIG. 4) is greater than the force of the electrostatic field. A nonmagnetic rod or pin 66 may be provided on the opposite side of the rotor to dynamically balance the rotor 30 within the housing 24.

The fault indicator 20 may be secured to the cable 10 in any position relative to the cable so long as the rotor 30 moves in response to the forces of the electrostatic and magnetic fields. This will depend on the location of the electrically conductive patches 38 and 39 and armature 64 on the rotor 30. In the drawings the indicator is shown mounted with the rotor 30 in a substantially parallel relation to the cable 10. Prior to mounting the indicator on the cable 10 the semiconductive sheath 68 is stripped from a section of the cable 10 and a semiconductive support 22 is wrapped around the cable to form a cradle for the fault indicator 20. Magnetic pole pieces 70 are embedded in the support 22 on each side of the cable for alignment with the magnetic armature 64. An insulating envelope 72 made of a dielectrical material such as rubber is wrapped around the fault indicator 20, the body 22 and the exposed section of the cable 10. A semiconductive material 74 is provided on the outside surface of the insulating envelope 72 and is overlapped at each end by the semiconductive sheath 68. Parallel flanges 76 may be provided around the outside of the housing 24 to engage recesses on the inside surfaces of the envelope to hold the fault indicator in a fixed position on the cable 10. The bosses 44 and 46 with the light conductive wires 48 and 49 project outwardly from the envelope 72. The fault indicator 20 occupies a small section of the cable since it is only 3 inches long and when mounted on the cable in the envelope 72 occupies about 6 inches of cable length.

In order to describe the operation of the fault indicator and the method of detecting the location of a fault in the cable, a representative underground electrical system is shown schematically in FIG. 5. This system includes the underground cable 10 with a substation 80 connected to one end of the cable 10 and a number of fault indicators A, B, C, D, E, F and G indicated along the cable 10. Current interruption is achieved by means of a circuit breaker for fuse 82 provided on the cable 10 next to the substation 80. A voltage-distance diagram is shown above the cable 10 with a normal voltage along the cable 10 indicated by line 84 which shows a slight drop in voltage from left to right. An electrostatic field and a magnetic field will be present around the cable 10 when the normal voltage is present on the cable. However, the force of the electrostatic field is greater than the force of the magnetic field due to normal current and all of the rotors 30 in the indicators 20 will be in the first position.

A "fault" as used here refers to a short circuit in the system which trips the circuit breaker 82 and deenergizes the line. No electrical signals will be present on the line to aid in locating this point or section of the line where the fault occurred.

When a fault occurs in the cable 10 as indicated at $x$ between indicators D and E, the voltage in the cable 10 will drop to zero as indicated by line 86 in the voltage-distance diagram. The electrostatic field will also drop to zero at the fault $x$. A momentary surge current will occur in the cable between the power source 80 and the fault $x$ increasing the force of the magnetic field sufficiently to exceed the force of the electrostatic field. The rotors 30 in all of the indicators A, B, C and D between the power source and fault $x$, where the surge current occurs, will rotate to the second position shown in FIG. 4. The indicators E, F and G beyond the fault $x$ are not affected by the surge current and will remain in the first position shown in FIG. 3. Current interruption will occur a short time after the fault occurs and since the rotors are dynamically balanced, they will remain in the position they were in at the time of current interruption. When the operator checks the indicators in the cable, he will start at the source 80 and will find that the indicators A, B, C and D have been tripped or moved to the second position. The next indicator E will still be in the initial or first position. The operator then knows that the fault occurred in the section of the cable between indicators D and E since the surge current only occurs between the power source and the fault $x$. The remaining indicators F and G will also remain in the first position. When line current is restored in cable 10, the force of the electrostatic field will also be restored and all of the rotors that were tripped by the fault current will rotate back to their original positions. Although all of the indicators between the power source and the fault have been indicated as tripped, one or more of the indicators in close proximity to the power source may remain in the initial or first position because the voltage is still high and the force of the electrostatic field may be higher than the force of the magnetic field caused by the surge current. This will not affect the linesman in checking the cable since the fault will be in the section of the cable beyond the indicator farthest from the power source having a rotor in the second position.

In the alternate form of the invention shown in FIGS. 6, 7 and 8, a fault indicator 100 is disclosed which provides an indication of the electrical condition of an underground cable or an electrical apparatus 101 at any time, as well as an indication of the section of an underground cable or electrical apparatus where a fault has occurred. More particularly, the fault indicator 100 includes a rotor 102 pivotally mounted on pivot pins 104 and 106 in housing 108. A voltage sensitive element in the form of electrically conductive patches 110 and 112 are provided on the outer surface of the rotor and are connected to a pair of leads 114 for a lightbulb 116 embedded within the rotor 102. The electrically conductive patches 110 and 112 move the rotor in response to the force of an electrostatic field to a first position as described above. The patches 110 and 112 also provide a capacitive current across the leads 114 sufficient to illuminate the lightbulb 116 when subjected to the force of the electrostatic field. Whenever the light 116 is lit, it indicates that the indicator is under the influence of an electrostatic field and the cable is energized. If the indicator is located in a position where it can be observed, the linesman can tell if the cable is energized by merely observing the light.

The rotor is moved to the second position in response to a surge or fault current when a fault occurs in the cable by means of a current sensitive element in the form of a magnetic armature 118 embedded in the rotor 102. The motion of the rotor 102 in response to the forces of the magnetic and electrostatic fields is the same as described in connection with the motion of the rotor 30 in the indicator.

If the indicator is located in a position where it cannot be observed, the position of the rotor 102 is determined by means of light conductive members 120 and 122 secured in flange 124 on the housing with the inner ends of the members 120 and 122 in axial alignment on opposite sides of the rotor 102. If the cable is energized, the light from lightbulb 116 can be seen at the outer ends of either of the light conductive members 120 or 121. If a fault occurs on the cable, the rotors 102 in the indicators between the source of power and the fault will respond to the change in the force of the magnetic field as described above. The position of the rotor 102 is determined after current interruption by shining a light at the outer end of member 120 or 122. If a light is observed at the outer end of the other member, the rotor is still in the first position when line current was interrupted. If a light is not observed at the outer end of the other member, the rotor has moved to the second position. When the rotor 102 is in the second position, the light path through the conductive members 120 and 122 will be blocked by a shade or mask 140 provided on the surface of the rotor 102. When line current is restored in the cable 10, the electrostatic field will also be restored and the rotors 102 will return to their original position and the lightbulb 116 will be reenergized.

The indicator in FIGS. 6, 7 and 8 is shown mounted in a radial relation to an electrical apparatus that forms a part of the high voltage system. This merely exemplifies that the indicator can be mounted in any position so long as the voltage sensitive elements and the current sensitive elements are properly arranged to rotate the rotor in response to the presence of electrostatic or magnetic forces.

Although a rotor has been shown and described, it is possible to provide a means for indicating the electrical condition of the cable by an indicator other than a rotor as seen in FIG. 9. A plurality of metal flakes 150, such as iron, are shown suspended in a dielectric fluid 152, such as oil, in a sealed housing 154 secured to a cable 158 by an iron ring 157. A potential coil 156 is provided on the outside of the housing 154 and is connected to be responsive to the presence of a voltage on the cable 158. The metal flakes will then align themselves in a first position "A" within the housing 154 in response to the presence of a voltage on the cable and in a second position "B," shown dotted, when a fault occurs on the cable and a magnetic circuit is established in the iron ring 157. The magnetic flakes when in the first position "A" within the housing will block the light path through light conductive members 160 provided on diametrically opposite sides of the housing.

The fault indicators described herein provide a visual signal which is tripped by a "fault" and is reset by restoration of normal service.

What I claim is:

1. A fault indicator for an electrical conductor, said indicator comprising
   a semiconductive support adapted to be mounted on the conductor and including a pair of magnetic pole pieces,
   a housing adapted to be mounted on said support,
   a rotor sealed within said housing,
   first means carried by said rotor for rotating said rotor in one direction to a first position within said housing in response to normal voltage on the conductor,
   and second means on said rotor for rotating said rotor in the other direction to a second position within said housing in response to a fault current on the conductor.

2. The fault indicator according to claim 1 wherein said rotor is dynamically balanced to remain in a fixed position on current interruption.

3. A fault indicator for an electrical conductor, said indicator comprising
   a housing adapted to be mounted on the conductor,
   a rotor sealed within said housing,
   first means for rotating said rotor in one direction to a first position within said housing in response to normal voltage on the conductor,
   second means for rotating said rotor in the other direction to a second position within said housing in response to a fault current on the conductor,
   means mounted on said housing for conducting light through said housing, and
   means mounted on said rotor for interrupting the light path through said light conducting means when moved to one of said positions.

4. A fault indicator for an electrical conductor, said indicator comprising,
   a housing adapted to be mounted on the conductor,
   a rotor sealed within said housing,
   first means for rotating said rotor in one direction to a first position within said housing in response to normal voltage on the conductor,
   second means for rotating said rotor in the other direction to a second position within said housing in response to a fault current on the conductor,
   and light means embedded within said rotor and being responsive to a normal voltage on the cable.

5. A fault indicator according to claim 4 including a light conducting filament mounted on said housing to provide a visual indication of the condition of said light means at a point remote from said light means.

6. A self-restoring fault current indicator for an electric cable, said indicator comprising a sealed housing,
   a rotor within said housing,
   a magnetic force responsive means for rotating said rotor in one direction to a first position in said housing,
   an electrostatic force responsive means for rotating said rotor in the other direction to a second position in said housing,
   a light in said rotor responsive to an electrostatic force on the cable.

7. A self-restoring fault current indicator for an electric cable, said indicator comprising
   a semiconductive support wrapped around said cable and including a pair of magnetic pole pieces,
   a sealed housing mounted on said support,
   a rotor within said housing,
   a magnetic force responsive means embedded within said rotor in operative relation to said pole pieces for rotating said rotor in one direction to a first position in said housing,
   and an electrostatic force responsive means mounted on said rotor in operative relation to said support for rotating said rotor in the other direction to a second position in said housing.

8. A fault indicator according to claim 7 including means remote from said indicator for visually determining the position of said rotor in said housing.

9. A fault indicator according to claim 8 wherein said means comprises
   light conductive members each having one end mounted on diametrically opposite sides of said housing and the other end accessible at a point remote from said housing, and
   a mask mounted on said rotor for movement into and out of the light path through said light conductive members.

10. A system for locating a fault in an electric power distribution circuit, including a source of electric power, a power line and a circuit interrupter which deenergizes the line in response to a current surge caused by a short circuit fault occurring along the line, the improvement comprising
- a number of fault indicators connected to the line at spaced intervals, each indicator including
- a semiconductive support adapted to be mounted on the line and including a pair of magnetic pole pieces.
- a housing adapted to be mounted on said support,
- a rotor sealed within said housing,
- first means embedded within said rotor for rotating said rotor in one direction to a first position within said housing in response to normal voltage on the line,
- and second means mounted on said housing for rotating said rotor in the other direction to a second position within said housing in response to a fault current on the line.
- whereby on current interruption those indicators subjected to normal voltage will remain in the first position and those indicators subjected to a fault current will remain in the second position.